United States Patent [19]
Liu et al.

[11] Patent Number: 4,879,127
[45] Date of Patent: Nov. 7, 1989

[54] METHOD OF PRESERVING PRODUCE FOR FURTHER PROCESSING

[75] Inventors: Yuan K. Liu, Concord; Philip A. Kuhmichel, Antioch; Fred G. Cordes, Oakland; Wayman Wong, Concord, all of Calif.

[73] Assignee: Del Monte Corporation, San Francisco, Calif.

[21] Appl. No.: 266,338

[22] Filed: Nov. 1, 1988

Related U.S. Application Data

[63] Continuation of Ser. No. 78,803, Jul. 28, 1987, abandoned, which is a continuation-in-part of Ser. No. 76,702, Jul. 23, 1987.

[51] Int. Cl.$^4$ ............... A23B 7/04; A23B 7/08; A23L 3/10
[52] U.S. Cl. .................. 426/325; 426/327; 426/393; 426/407; 426/419; 426/639
[58] Field of Search ............... 426/131, 321, 325, 327, 426/544, 546, 547, 615, 640, 654, 658, 419, 393, 402, 407, 326, 639

[56] References Cited

U.S. PATENT DOCUMENTS 1,564,599 12/1925 Magaw .
1,631,974 6/1927 McLaughlin .
2,516,891 8/1950 Lloyd .
3,025,169 3/1962 Guadagni .

OTHER PUBLICATIONS

J. Woodroof et al., *Commerical Fruit Preservation of Foods*, pp. 347–351 (1975).

A. Nicotra et al., "Considerations of the Suitability for Freezing of Some Peach and Apricot Varities", *Progress in Refrigeration Scient and Technology*, pp. 291–295 (1973).

D. Tressler et al., *The Freezing Preservation of Foods*, vol. II, pp. 358–362 (3d Ed. 1957).

"Dip Process for IQF Fruit Eliminates Syrup but Retains Flavor, Color of Fresh", *Quick Frozen Foods*, vol. 33, No. 9 (1971).

*Primary Examiner*—Arthur L. Corbin
*Attorney, Agent, or Firm*—Richard Kornutik

[57] ABSTRACT

A process for storing produce for extended periods of time prior to further processing by canning or the like, which comprises the steps of immersing the produce in a substantially isotonic aqueous storage solution, wherein the solutes content of the storage solution is adjusted such that the osmotic pressures of the produce and the storage solution are substantially equal. The storage solution preferably comprises an edible sugar, an edible organic acid, and an edible oxygen scavenger. The produce is than stored in the solution at a temperature below about 40° F. and subsequently canned and sterilized.

11 Claims, No Drawings

METHOD OF PRESERVING PRODUCE FOR FURTHER PROCESSING

This application is a continuation of application Ser. No. 078,803 filed July 28, 1987, now abandoned, which is a continuation-in-part of application Ser. No. 076,702 filed July 23, 1987.

FIELD OF THE INVENTION

This invention relates generally to a method of treating fresh produce. More particularly, the present invention relates to a method of storing produce in a frozen or chilled state, i.e. at temperatures below ambient temperature, for extended periods of time prior to final processing by canning or the like.

BACKGROUND OF THE INVENTION

The canning industry has long desired a method for preserving fresh produce, e.g. fruits and vegetables, for extended periods of time after harvesting so that canning and/or other further processing can be conducted when desired. However, in accordance with the present state of the art canneries are required to utilize an inordinate amount of labor and equipment to ensure that the freshly harvested produce is quickly processed shortly after harvesting and before the product deteriorates in quality.

Typically, shortly after the harvesting season is over, the canneries are shut down and are no longer productive. Consequently, overall costs for the canning industry are greatly increased.

Prior suggestions for preserving freshly harvested produce before canning have been unacceptable for a variety of reasons. For example, although modified or controlled atmosphere post-harvest storage techniques have been found useful for extending the storage life of fruits and vegetables at 32° F. for up to about three to six weeks, such techniques have generally only been effectively applied to certain varieties of fruits and vegetables.

Alternatively, it has been suggested to aseptically process the harvested fruit or temporarily process fruit into large cans which are cut open at a later time, so that the fruit can be reprocessed into smaller cans for distribution to the consumer. However, because the texture of the fruit is altered (e.g., softened) during the thermal processing required by these methods, the treated fruit cannot satisfactorily withstand further processing, e.g. canning. Also the cut-open cans must be handled and disposed of in an acceptable manner.

It has also been proposed to subject harvested fruit to block freezing or individual quick freezing ("IQF"). However, because the structural integrity of the block frozen fruit is not maintained during thawing, the fruit is rendered unsuitable for canning. Moreover, IQF methods may be found objectionable because of the high capital costs involved.

SUMMARY AND OBJECTS OF THE INVENTION

Accordingly, it is an object of the present invention to provide a method of preserving freshly harvested produce for extended periods of time prior to final processing by canning or the like, while maintaining during the preservation period the desired qualities possessed by the produce after harvest.

Another object of the invention is to provide a method of storing fresh produce in a frozen or chilled state prior to final processing, wherein the organoleptic qualities, and structural integrity of the produce are retained.

A further object of the invention is to provide a method for processing produce by canning or the like, wherein the treated produce is able to withstand further processing without significant degradation of its organoleptic properties.

These objects and other subsidiary objects and advantages of the invention will be apparent to those skilled in the art based on the detailed discussion presented herein of the manner in which the invention is practiced.

The present invention provides a storage solution for storing fresh produce for extended periods without deterioration prior to final processing, which comprises a solutes-containing, substantially isotonic storage solution, wherein the solutes content of the storage solution is adjusted such that the osmotic pressures of the produce and storage solution are substantially equal. The solution is typically characterized by a solutes content of from about 6 to about 21%.

When the solution is used to treat fruit, the solutes included therein preferably comprise an edible sugar, an edible organic acid, and an edible oxygen scavenger, and the storage solution preferably comprises from about 79 to about 94% water, from about 5 to about 20% sugar, from about 0.1 to about 0.7% organic acid, and from about 0.10 to about 0.25% oxygen scavenger. All compositional percentages herein are by weight unless otherwise specified.

The sugar is preferably a saccharide selected from the group consisting of sucrose, fructose, maltose, glucose, and mixtures thereof, and is most preferably sucrose, while the organic acid is preferably selected from the group consisting of citric acid, fumaric acid, malic acid, succinic acid, lactic acid, and mixtures thereof, and is most preferably citric acid. The oxygen scavenger is preferably selected from the group consisting of ascorbic acid, glutathione, cysteine, and mixtures thereof, and is most preferably ascorbic acid.

The present invention also provides a method of storing fresh produce for extended periods of time, e.g. for at least about 10 weeks, without significant deterioration prior to final processing, which comprises the steps of immersing the produce in the above-described substantially isotonic aqueous storage solution; and maintaining the produce disposed in the storage solution at a temperature below about 40° F. The treated produce is preferably maintained in storage at freezer temperatures ranging from about −20° F. to about 10° F., and is most preferably stored at about 0° F.

The invention additionally provides a method of preparing canned produce which further comprises the steps of removing the produce from the storage solution of the invention, and canning the treated produce.

DETAILED DESCRIPTION OF THE INVENTION

While the present invention will be particularly described in connection with the treatment of peaches, it should be appreciated that the invention is equally applicable to other fruits, including for example such fruits as nectarines, apricots, pineapples, pears, grapes and others, which may need to be preserved for extended periods of time prior to further processing. In addition, the invention is applicable to those vegetables that can be treated to advantage in accordance with the principles of the invention.

Fruits and vegetables are generally composed of solute, e.g. sugar and other solids, containing juices which exert an osmotic pressure against the external membranes of the produce. When such produce is placed into a solution having a different concentration than that of the produce, solvent and solute molecules diffuse through the external produce membranes until a dynamic steady-state equilibrium is reached, and the concentrations of the internal produce juices and surrounding solution are equalized. The actual rate and extent of molecular transport may be determined by such factors as membrane pore size and the "solubility" of the transported molecule in the produce membranes.

Solvent molecules in particular will be transported via "osmosis" from the more dilute solution to the more concentrated solution until a steady-state equilibrium is reached. The solution having a higher concentration, and hence a higher osmotic pressure is described as "hypertonic", while the more dilute solution is referred to as "hypotonic". The term "isotonic," on the other hand, is used to refer to solutions having substantially equal concentrations and therefore substantially equal osmotic pressures.

When produce is placed into a storage solution having a greater osmotic pressure, due to, for example, there being a higher solutes content in the solution than that in the produce, exfusion of water out of the produce is induced. As a result, the cell structure of the produce collapses, the produce becomes shrunken and unappealing, and the sugar content of the produce is increased above the natural Brix level of the produce. Such increases in sugar content and sweetness are objectionable where as here the objective is to preserve the produce for extended periods of time while maintaining the natural structural, compositional, flavor and appearance characteristics of the produce. On the other hand, if produce is placed into a storage solution having a lower osmotic pressure than that of the produce, infusion of the solution into the produce is induced. According to the invention, the structural integrity and organoleptic characteristics of fresh produce are substantially preserved for extended periods of time prior to final processing by canning or the like, by suspending the produce in a solutes-containing, substantially isotonic storage solution, wherein the solutes content of the storage solution is adjusted such that the osmotic pressures of the produce and storage solution are substantially equal, so that infusion or exfusion are substantially inhibited during the time period of preservation; and maintaining the suspended produce in cold storage at a temperature below about 40° F. When desired, the fruit is removed from storage, thawed if frozen, and processed by conventional means. As described in further detail below, when the solution is used to treat fruit, the solutes included therein preferably comprise an edible sugar, an edible organic acid, and an edible oxygen scavenger.

By adjusting the solutes content of the storage solution according to the invention, so that the osmotic pressure of the produce and storage solution are substantially equal, the changes in produce texture and organoleptic characteristics resulting from infusion and exfusion of solution through the produce membranes are minimized or eliminated. It has been determined that the texture and flavor of the treated produce are substantially retained even after extended storage at depressed temperatures and through the freeze/thaw cycle. Moreover, the treated produce is able to withstand further processing without significant degradation of the organoleptic properties thereof.

Another important aspect of the invention is that costs for the canning industry are greatly minimized. In the first place, the canning season can be extended so that plant operating capacities are maximized and cannery overhead is reduced. Both the bulk containers in which the produce is stored and the storage solution are recoverable and reusable. Additionally, no change in the procedure customarily used for directly canning the fresh produce is required.

The storage solution of the invention is characterized by a solutes content substantially equivalent to that of the natural fruit or vegetable juices. Although the solutions of the invention are generally characterized by a high sugar content, other water-soluble additives may be employed as well, as long as the total solutes content is sufficient to provide the desired osmotic pressure. Included in the class of water soluble non-sugar solids that can be utilized, for example, are a variety of minerals, salts, acids, antioxidants, pectins, diols, and polyols that meet palatability requirements in the amounts used.

The actual amount of total solutes required in solution will depend upon the initial solutes content of the treated fruit or vegetable. Fruits and vegetables contain a variety of solutes, including primarily sugar, as well as organic acids, enzymes, pectins, and carotenoids. The amounts and ratios of such solutes depend upon a number of factors known in the art, e.g. the particular variety of fruit or vegetable employed, climatic growing conditions, and degree of maturation.

The solutes content of the fruit or vegetable may be determined, for example, by using any of the commercially available devices for measuring solutes content, in combination with known mathematical calculations. For instance, refractometers are devices commonly used to measure the solute contents of a solution.

In using a refractometer, a sample may first be prepared by grinding portions of the fruit or vegetable in a blender for sufficient time to yield a well-mixed syrup, which is then strained through filter paper or a perforated screen. Several drops of filtrate are placed onto the stationary prism of the refractometer, and a refractometer reading is obtained by adjusting the refractometer pursuant to the instructions for the particular instrument employed. Depending upon the particular calibration scale that is utilized, i.e. whether the scale is calibrated to read total solutes content or degrees Brix, for example, the reading may need to be corrected by known mathematical methods to obtain an accurate solutes content value.

It is not necessary to measure the solutes content of each individual treated fruit or vegetable. Instead, it is sufficient to obtain an approximate solutes content by testing various samples from the top, middle, and bottom of a load. Also, minor differences in solutes content are acceptable as long as the overall osmotic pressures of the produce and storage solution are substantially balanced to prevent alteration of the texture and structural integrity of the treated produce. For example, it may be desired to decrease the solutes content of the storage solution by about 1% to ensure that the produce is kept submerged therein to minimize oxidative browning.

The solutions of the invention are generally characterized by a solutes content of from about 6 to about 21%. More typically, the solution will have a solutes content of from about 11 to about 16%.

Generally, edible sugars and edible organic acids will be employed as the primary sources of water soluble solids. The actual relative amounts of solutes required will vary depending on the amounts of other molecular weight solids present to effect the osmotic pressure of the system. Preferably, the sugar and acid contents of the storage solution will be adjusted to match those of the treated produce, to inhibit exchange of sugar and/or acid through the external membranes of the produce, thereby ensuring that the natural flavor characteristics of the produce are retained.

The initial acid content of the treated produce can be determined, for example, by titration with sodium hydroxide using a phenolphthalein indicator. The initial sugar content can be determined, for instance, by obtaining a reading from a refractometer which has been calibrated to a Brix scale, or by correcting a predetermined solutes content value to account for acids and other non-sugar containing solids.

When used to treat peaches or other fruit, the storage solution of the invention will typically be characterized by a sugar content of from about 5 to about 20%, or more preferably from about 10 to about 15%. The storage solutions will also typically include from about 0.1 to about 0.7% organic acid, and more preferably from about 0.2 to about 0.7% organic acid. Different amounts of sugar and acid can, however, be used, if offset by increases or decreases in the amounts of other solutes.

As mentioned below, the storage solution used for treating vegetables will generally contain less sugar, and may include added salt as required to meet palatability requirements.

The terms "sugar" and "organic acid" are used herein to refer to any of a number of saccharide compounds and organic acids which are capable of increasing the osmotic pressure of the water in which they are dissolved.

The selected sugar, which should have good organoleptic properties in the amounts used, may be a monosaccharide, disaccharide, polysaccharide, or degradation product thereof. The commercially available sugars which are typically used include, in particular, sucrose, as well as fructose, maltose, glucose, or mixtures thereof. High fructose corn syrup is a possible source of sugar for the preservatives of the invention.

The organic acid selected should also be palatable in the amount employed. For example, any flavor imparted by the selected acid to the storage solution should preferably be compatible with the fruit or vegetable undergoing treatment. Although mineral acids may be employed, the storage solutions of the invention will more typically include a fruit or vegetable acid such as citric acid, fumaric acid, malic acid, succinic acid, lactic acid, and mixtures thereof. Citric acid will generally be most commonly employed.

The storage solutions of the invention may also include an amount of an oxygen scavenger which is sufficient to bind any residual oxygen present in the system, thereby inhibiting oxidative browning. The oxygen scavenger can be selected from the variety of edible agents known in the art including in particular ascorbic acid, as well as glutathione, cysteine, and mixtures thereof. The preservatives of the invention will typically be characterized by an oxygen scavenger content of from about 0.1 to about 0.25%, and more preferably from about 0.12 to about 0.18%.

One type of a storage solution which has been particularly well-adapted for use according to the present invention are solutions for extending the storage life of peaches prior to further processing by canning or the like. Such solutions preferably comprise about 89% water, about 10% sugar, and about 0.4% organic acid, and about 0.15% oxygen scavenger. The sugar is preferably sucrose, the acid is preferably citric acid, and the oxygen scavenger is preferably ascorbic acid.

In addition to sugars, organic acids, and oxygen scavengers, the storage solutions of the invention may optionally include other food additives used in amounts sufficient to impart their characteristic effects. Such additives may include, for example, edible colorants and flavorants known in the art. These additives will be selected according to the desired attributes of the treated produce. Such additives will typically be employed in amounts ranging from about 0.1% to about 0.5% by weight of the storage solution.

Before the storage solution is mixed with the produce, it is preferably sterilized to inhibit microbial spoilage, by heating the storage solution to about 190° F., or by subjecting the solution to ultra-violet radiation. The solution is then preferably chilled to a temperature below about 45° F., and more preferably to a temperature ranging from about 35° to about 45° F. before being combined with the fruit or vegetables.

The fruits which may be treated in accordance with the invention include a wide variety of peaches, pineapples, nectarines, apricots, pears, and others. Vegetables suitable for treatment may include peas, corn, green beans, chili peppers, lima beans, and the such. When vegetables are treated according to the invention, the storage solution will generally contain less sugar and will often contain added salt as required to meet palability requirements. In such cases, the sugar and salt concentrations of the storage solution will be balanced within the other solutes present as required to ensure that a substantially isotonic solution is achieved.

In general, prior to being placed in the preservative, the produce is pitted, cored, sliced, diced, lye peeled, and/or washed, or otherwise prepared in accordance with the usual practice for the selected produce. In general, a state of equilibrium wherein the concentrations of the treated produce and the storage solution are balanced will be reached more rapidly if the produce is peeled, sliced, pricked or otherwise treated. The produce may also be subjected to a vacuum to remove oxygen and inhibit oxidative browning.

The prepared produce is then placed in suitable bulk containers, which may be 5 or 55 gallon drums or higher depending on the particular needs of the cannery or processing plant. Polyethylene lining of the larger containers is recommended to aid in cleanup. Next, the produce is completely immersed in the storage solution and the container is closed.

Optimally, the weight ratio of produce to storage solution should be as high as possible and still enable the solution to cover the produce. The ratio of produce to storage solution is preferably from about 1.5:1 to about 3:1, and is most preferably about 2:1.

To ensure that the produce is kept covered by the storage solution and not subjected to air oxidation, a plastic disk cut to fit snugly inside the container can be pressed down on top of the produce. Alternatively, the density of the solution can be adjusted so as to be slightly lower than that of the produce, as described above, to ensure that the produce is kept submerged in the solution, provided that the solution is substantially isotonic as described herein.

After being submerged in or otherwise coated with the solution, the produce is placed into cold storage at temperatures below about 40° F.

According to one embodiment of the invention, the treated produce is maintained in storage at freezer temperatures prior to final processing. The treated produce can be maintained at freezer temperatures for extended periods of time without deterioration. Typical freezer temperatures range from about −20° to about 10° F. The produce is preferably stored at about 0° F.

Unlike IQF methods, no expensive equipment is required to achieve freezing. Instead, the treated produce can simply be allowed to freeze slowly in a freezer warehouse. The filled containers are preferably transported to the freezer warehouse via refrigerated trucks.

The treated produce will typically freeze solid within about 24 hours after being placed in storage at freezer temperatures. The use of a substantially isotonic storage solution inhibits significant textural and structural alterations in the produce during the time period required for the produce to reach a frozen state.

As an alternative to freezing, the treated produce can be stored at refrigerated temperatures below about 40° F. for lesser amounts of time than at freezer temperatures without being rendered unsuitable for final processing. Typical refrigerator temperatures range from about 28° to about 32° F.

Prior to placing the produce into storage, it is preferable to rapidly cool the produce to below about 40° F., in order to reduce microbial spoilage. This can be achieved by vacuum cooling, which also aids in the elimination of oxygen from fruit and vegetable tissues, or by mixing the produce with sufficient ice to lower the temperature of the produce to below about 40° F. The amount of added ice must be considered when determining the final concentration of the storage solution.

To achieve vacuum cooling, the prepared produce is placed in a sealed vacuum chamber which is then evacuated to rid the produce tissues of air and rapidly cool the produce to below about 40° F. According to one embodiment of the invention, the vacuum is broken with $N_2$ gas. The chilled produce is then placed in bulk into suitable containers and topped with refrigerated storage solution prior to being placed in a freezer warehouse, where gradual freezing takes place. In another embodiment of the invention, the vacuum chamber is broken with a spray of the solution to cover the produce. The mixture is then filled into a bulk container and transferred to a freezer warehouse for storage.

When the produce is mixed with ice to achieve precooling, the amount of ice required will depend upon a number of factors, including primarily the amount of produce to be treated. In general, the weight ratio of ice:solution:fruit will preferably be about 1:1:4. The syrup will preferably comprise from about 59 to about 89% water and from about 11 to about 41% solutes. When used to treat fruit, the syrup preferably comprises from about 10 to about 40% sugar, from about 0.2 to about 1.4% acid, and from about 0.2 to about 0.5% oxygen scavenger. More preferably, the syrup comprises from about 71 to about 79% water, from about 20 to about 28% sugar, from about 0.4 to about 1.4% acid, and from about 0.23 to about 0.35% oxygen scavenger by weight. A syrup particularly adapted for use with peaches comprise about 79% water, about 20% sugar, about 0.8% acid, and about 0.3% oxygen scavenger. The syrup is chilled, and the produce is mixed with the cold syrup and ice prior to being placed in bulk containers for storage at freezer temperatures.

The produce treated according to the invention can be maintained in storage for at least about 10 weeks without significant degradation in texture and flavor and without being rendered unsuitable for further processing.

When desired, the treated produce is removed from storage, drained, thawed if necessary, and further processed by canning or other means.

Canning can be achieved, for example, by filling the treated produce into cans, e.g. No. 10 cans, along with canning syrup having the desired Brix. Next, the filled cans are sealed and the contents are heat sterilized.

The weight ratio of produce to canning syrup will preferably be about 2:1. If desired, the storage solution may be saved and used as a canning syrup. Other syrups which may be used include any of the commercial available canning syrups e.g. "heavy" and "lite" sugar-containing canning syrups for fruit.

As used herein the phrase "lite canning syrup" refers to canning syrup containing about 100% sucrose. Such syrups are commercially available from Del Monte Corporation. The phrase "heavy canning syrup", on the other hand, denotes a canning syrup containing about ⅓ "canners corn syrup", about ⅓ sucrose, and about ⅓ high fructose corn syrup having a Brix of about 76.8°. Canners corn syrups, which are available, for example, from Corn Products and American Maize, contain about 71% solids, have a dextrose equivalent of about 63 and a Baume value of about 49.

The foregoing canning syrups are only exemplary and may vary from the representative formulas provided. The particular canning syrup selected will vary depending upon such factors as consumer preferences, the type of canned produce, and its intended end use.

After the filled cans have been sealed by any one of the methods known in the industry, the produce is heat sterilized. Heat sterilization can be achieved by any of the known methods, including agitated and still retort cooking.

In general, sterilization can be achieved at lower temperatures and/or in a shorter period of time when agitated retort cooking is employed, as opposed to still cooking. The temperature and length of cooking required to achieve sterilization will depend upon a variety of factors known to those in the art, including can size, the amount and size of the treated produce, and the degree of produce maturation. For example, younger and firmer produce may be cooked longer to develop a softer texture if desired.

In general, fruit sterilized by agitated retort cooking in No. 10 cans will be cooked at a temperature ranging from about 210° F. to about 230° F. for about 20 to about 30 minutes. Peach halves, in particular, will generally be cooked at a temperature of about 210° F. for about 28 minutes. Peach slices and diced peaches, on the other hand, will generally be cooked at about 210° F. for about 27 minutes and about 22 minutes respectively. (As known in the industry, No. 10 cans hold about 109 oz. water, or about 107 oz. peaches).

The cooked fruit is typically cooled to a center can temperature of about 100° F. to about 110° F. by placing the can in ambient, i.e. about 70° F., water for about 10 to about 20 minutes.

Fruit placed into No. 303 cans (which hold about 16 oz. water) will generally be sterilized by agitated retort cooking at a temperature ranging from about 215° F. to about 230° F., or more preferably from about 218° F. to about 228° F., for about 9 to about 12 minutes.

Although produce treated according to the invention will usually be sterilized by agitated retort cooking, still cooking may also be employed. When fruit is still cooked, it will generally first be brought to a center can temperature of at least 165° F. by steam-heating the sealed cans in an enclosed exhaust box. The pre-heated fruit is then cooked in a still retort cooker for about 20 to about 30 minutes at a temperature ranging from about 215° F. to about 230° F. More preferably still cooking takes place for about 25 minutes at about 220° F.

Vegetable cooks will in general be more exacting (in terms of required time and temperature) than fruit cooks. As an example, peas treated according to the invention will generally be agitated retort cooked in No. 10 cans at a temperature of about 262°±2° F. for about 12±2 minutes. Still cooked peas are preferably cooked at a temperature of about 252° F. for about 35 minutes.

The following examples are not intended to be limiting, but rather illustrative of some approaches taken, and of course may be varied in accordance with the spirit and scope of this description.

EXAMPLE 1

Fresh peach halves were diverted from a processing line. The peach halves were mixed proportionally with ice and a 20° Brix syrup containing 0.3% ascorbic acid and 0.8% citric acid, at a ratio of 250 pounds of fruit, 7 gallons of the 20° Brix syrup, and 62.5 pounds of ice. After the ice melted and the temperature of the fruit had been brought to below 40° F., the resulting storage solution included 89% water, 10% sugar, 0.4% citric acid and 0.15% ascorbic acid. The covered fruit was filled into double polyethylene lined 55 gallon drums. The drums were covered and held in refrigerated storage for up to several hours. The drums were then transported to a commercial 0° F. warehouse for freezing and storage.

EXAMPLE 2

Diced peaches were blanched for up to 2 minutes in 200° F. water, and water sprayed cooled. Blanching was performed to remove oxygen from the diced peaches and also to reduce enzyme and microbial activity to allow for longer storage at freezer temperatures. The diced blanched peaches were then mixed as described above for Example I with ice and a 20° Brix syrup containing 0.3% ascorbic acid and 0.8% citric acid at a ratio of 250 pounds of peaches to 7 gallons of cold syrup and 62.5 pounds of ice. Thus, the initial storage solution prepared from the combined ice and syrup contained 89% water, 10% sugar, 0.4% citric acid, and 0.15% ascorbic acid. The treated fruit was filled into double polyethylene lined 55 gallon drums. The drums were covered and transported into a 0° freezing storage warehouse.

EXAMPLE 3

Diced peaches from a processing line were collected and spread on perforated trays to a depth of 2-3 inches. The trays were stacked in a vacuum chamber and sealed. The chamber was evacuated to 5 mm of mercury to rid the fruit tissues of air and rapidly cool the fruit to below 40° F. The vacuum was broken with a stream of nitrogen gas. 250 lbs. of chilled fruit were filled into polyethylene lined 55 gallon drums and topped with about 13.5 gallons of a refrigerated solution containing 89% water, 10% sugar, 0.4% citric acid, and 0.15% ascorbic acid. The drums were covered and placed in a frozen warehouse storage at 0° C. to allow for gradual freezing of the treated fruit.

EXAMPLE 4

The procedure described in Example 3 was repeated except that the vacuum was broken with a spray of solution to cover the 250 lbs. of fruit. The total amount of solution used was about 13.5 gallons. The chilled fruit/solution mix was then filled into polyethylene lined 55 gallon drums. The filled drums were transferred to freezer warehouse for storage at 0° F. for 10 weeks.

Following the completion of storage at freezer temperatures for 10 weeks, some of the 55 gallon drums containing peaches treated according to Examples 1-4 were placed in an ambient processing room for an amount of time sufficient to allow the peaches to thaw. The remaining 55 gallon drums were placed in a 45° F. room for 5 days. The peaches were then thawed at ambient room temperature until thawing was completed, i.e. the peaches were thawed at 70° F. for approximately 2 days. The remaining balls of soft ice and fruit was easily broken up for processing through the canning line.

The fruit was then drained and filled into No. 10 cans with canning syrup at a ratio of 2 parts fruit to 1 part syrup. The filled cans were sealed and the contents heat sterilized by agitated retort cooking. The peach halves and diced peaches were cooked at 210° F. for 28 minutes and 21.5 minutes respectively.

The resulting canned peaches exhibited good texture and flavor retention.

What is claimed is:

1. A method of preparing canned produce wherein the texture and flavor of the produce are retained after extended storage in a frozen state at freezer temperatures ranging from about −20° F. to about +10° F., which comprises the steps of suspending the produce in a solutes containing, substantially isotonic aqueous storage solution in which the solutes content is adjusted such that the osmotic pressures of the produce and solution are substantially equal; freezing the produce, while suspended in said solution in cold storage at temperatures ranging from about −20° F. to about +10° F. and maintaining the produce in a frozen state at said temperatures; removing the produce from the storage solution and from cold storage thereby thawing the produce without loss of structural integrity and organoleptic characteristics; filling the produce into cans with canning syrup; sealing the cans; and then sterilizing the contents of the cans.

2. The method according to claim 1, wherein the produce is maintained in cold storage for at least about 10 weeks.

3. The method according the claim 1, wherein the produce is stored at a temperature of about 0° F.

4. The method according to claim 1, wherein the solutes included in the solution comprise an edible sugar, an edible organic acid, and an edible oxygen scavenger.

5. The method according to claim 4 wherein the sugar and acid contents of the produce and storage solution are substantially balanced, and wherein the storage solution contains an amount of oxygen scavenger sufficient to inhibit browning.

6. The method according to claim 5, wherein the oxygen scavenger comprises ascorbic acid, glutathione, cysteine, and mixtures thereof.

7. The method according to claim 4, wherein the sugar is a saccharide selected from the group consisting of sucrose, fructose, maltose, glucose, and mixtures thereof.

8. The method according to claim 4, wherein the acid is selected from the group consisting of citric, fumaric, malic, succinic, lactic, and mixtures thereof.

9. The method according to claim 1, wherein the solution is used to treat fruit and comprises from about 79 to about 94% water, from about 5 to about 20% sugar, from about 0.1 to about 0.7% acid, and from 0.1 to about 0.25% oxygen scavenger by weight.

10. The method according to claim 9, wherein the solution comprises from about 84 to about 89% water, from about 10 to about 15% sugar, from about 0.2 to about 0.7% acid, and from about 0.12 to about 0.18% oxygen scavenger by weight.

11. A method of canning peaches wherein the texture and flavor of the peaches are retained after extended storage in a frozen state at freezer temperatures ranging from about $-20°$ F. to about $+10°$ F., which comprises the steps of suspending peaches in a solutes-containing, substantially isotonic aqueous storage solution in which the solutes content is adjusted such that the osmotic pressures of the peaches and solution are substantially equal, and wherein the storage solution comprises about 89% water, about 10% sugar, about 0.4% acid, and about 0.15% oxygen scavenger by weight; freezing the peaches, while suspended in said solution, in cold storage at temperatures ranging from about $-20°$ F. to about $+10°0$ F. and maintaining the peaches in a frozen state at said temperatures; removing the peaches from the storage solution and from cold storage thereby thawing the peaches without loss of structural integrity and organoleptic characteristic; filling the peaches into cans with canning syrup; sealing the cans; and then sterilizing the contents of the cans.

* * * * *